(12) United States Patent
Gautam et al.

(10) Patent No.: US 11,777,907 B2
(45) Date of Patent: Oct. 3, 2023

(54) COMPUTER ASSET DISCOVERY FOR DIGITAL TRANSFORMATION

(71) Applicant: INTERNATIONAL BUSINESS MACHINES CORPORATION, Armonk, NY (US)

(72) Inventors: Abhishek Kumar Gautam, Delhi (IN); Kailash Chandra Verma, Gurugram (IN); Pijush Kanti Biswas, New Delhi (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 402 days.

(21) Appl. No.: 17/211,434

(22) Filed: Mar. 24, 2021

(65) Prior Publication Data

US 2022/0311740 A1 Sep. 29, 2022

(51) Int. Cl.
*H04L 29/06* (2006.01)
*H04L 9/40* (2022.01)
*G06N 5/04* (2023.01)

(52) U.S. Cl.
CPC .............. *H04L 63/029* (2013.01); *G06N 5/04* (2013.01)

(58) Field of Classification Search
CPC .......... H04L 63/029; H04L 63/10; G06N 5/04
See application file for complete search history.

(56) References Cited

U.S. PATENT DOCUMENTS

| | | | | |
|---|---|---|---|---|
| 8,595,822 B2* | 11/2013 | Schrecker | ........... | H04L 63/1433 726/14 |
| 9,049,207 B2* | 6/2015 | Hugard, IV | ............ | H04L 63/20 |
| 9,830,458 B2* | 11/2017 | McBride | ............... | G06F 21/577 |
| 2014/0244819 A1* | 8/2014 | Patrick | ................ | H04L 41/0883 709/223 |
| 2018/0124072 A1* | 5/2018 | Hamdi | ................ | G06F 11/3428 |
| 2019/0281072 A1* | 9/2019 | Al Khater | ........... | H04L 63/0236 |
| 2020/0328941 A1* | 10/2020 | Feiguine | ............ | H04L 41/0895 |

OTHER PUBLICATIONS

Nunnally et al., "P3D: A parallel 3D coordinate visualization for advanced network scans", IEEE ICC 2013—Communication and Information Systems Security Symposium (Year: 2013).*

Mell, P. et al., The NIST Definition of Cloud Computing, National Institute of Standards and Technology, U.S. Dept. of Commerce, Special Publication 800-145, Sep. 2011, 7 pg.

* cited by examiner

*Primary Examiner* — Morshed Mehedi
(74) *Attorney, Agent, or Firm* — CUENOT, FORSYTHE & KIM, LLC (57) ABSTRACT

Computer assets within a defined network are identified using scanning services respectively connected to each of a plurality of network zones within the defined network. A plurality of interne protocol (IP) addresses within the particular one of the network zones are identified by a particular scanning service contained within the particular one of the network zones. The particular scanning service collects information associated with each of the plurality of IP addresses and infers, using the collected information, additional information about the plurality of IP addresses. The particular scanning service validates the additional information and presents analytics based upon the collected information and the additional information. Firewalls contained within the particular one of the network zones are configured to allow access by the particular scanning service.

20 Claims, 9 Drawing Sheets

| IP | Mac Address | PORT 80 | PORT 443 | PORT 139 | PORT 3389 | PORT 22 | PORT 9100 | Device | OS Version | Confidence Level |
|---|---|---|---|---|---|---|---|---|---|---|
| 10.0.0.0 | 00:1A:C2: 7B:00:47 | OPEN | OPEN | OPEN | OPEN | OPEN | CLOSED | Windows Server 2003 SP2 Build 3790.srv03_sp2_ gdr.070304-2240 | Version 5.0 (Build 2195: Service Pack 3) | 96% |
| 10.0.0.1 | 99:8H:F9: 2K:92:54 | OPEN | Closed | Closed | Closed | Closed | OPEN | HP LaserJet M1120n MFP | Unknown | 94% |
| 10.0.0.2 | 99:FF:9E: f9:0D:58 | OPEN | OPEN | OPEN | OPEN | OPEN | CLOSED | Acorp-W422G, wireless ADSL router | Linux 2.4.17_ mvl21-malta- mips_fp_le | |
| 10.0.0.7 | 39:57:F79 S:5J:8Z | OPEN | OPEN | OPEN | OPEN | OPEN | CLOSED | Instar IN-3010 surveillance camera | Linux 2.4 | 89% |
| 10.0.0.15 | 98:H9:0F: 3K:9F:4K | OPEN | Closed | Closed | Closed | Closed | OPEN | Airvana HubBub C1-600-RT | Linux version 2.6.21.7-hrt1- WR2.0b1_ standard on PowerPC (MPC83XX) | 91% |
| 10.0.0.18 | 93:9D:OD: 93:8G:4K | OPEN | Closed | Closed | Closed | Closed | OPEN | ASUS RT-N56U WAP | Linux 3.4 | 68% |

COMPUTER ASSET DISCOVERY FOR DIGITAL TRANSFORMATION

BACKGROUND

The present invention relates to digital transformation, and more specifically, to identifying and analyzing the computer assets within an enterprise.

Digital transformation describes the process of integrating new digital technology such as information technology (IT) into an enterprise, which includes both big and small companies, government entities, and other types of organizations. One goal of digital transformation is to deliver added value to both internal customers/clients of the enterprise through the use of the digital technology. Naturally, most enterprises already employ digital technology as part of their business processes/operations, and digital transformation can be an ongoing process of continual improvement.

Figure 1:
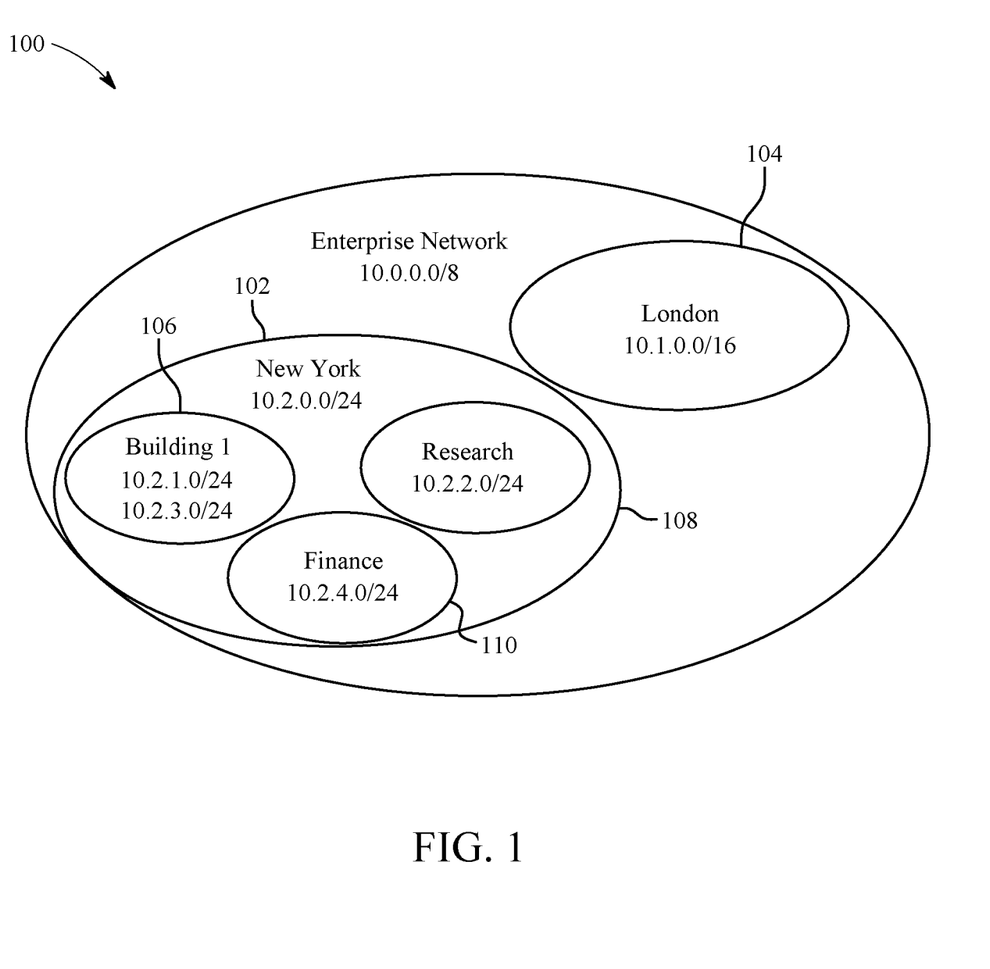
FIG. 1 is a block diagram illustrating an example of a subnet within an enterprise network.

Reference is made to FIG. 1, which illustrates an exemplary enterprise network 100 consisting of multiple nodes 102, 104. A particular node 102 may represent a networked device or, in many situations, a particular node 102 may be a subnet (i.e., a sub-network), which itself can consist of multiple nodes 106, 108, 110. The precise manner by which an enterprise network 100 is split up into subnets 102, 104 varies from enterprise to enterprise. For example, subnets 102, 104 can be defined by geographic location (e.g., London and New York). Alternatively and/or additionally, a subnet can be devoted to a particular building 106 (e.g., Building 1) or to particular functional units of the enterprise 108, 110 (e.g., Research and Finance).

For digital transformation to occur, an important step is to identify, within the enterprise network 100, the current computer assets (as used herein, the term "computer assets" refers to both hardware and software), which are collectively referred to as the enterprise's IT landscape. Typically, this type of information can be found in a configuration management database (CMDB) and is needed to better inform decision making as to what new digital technology is to be added, what old digital technology can be kept, and what old digital technology can be replaced and/or repurposed. However, the problem that many enterprises face when engaging in digital transformation is that the CMDB can be outdated and/or incomplete, and consequently, the enterprise may have outdated and/or incomplete knowledge as to the full scope of their IT landscapes within their enterprise network 100.

While identifying the computer assets associated with a single subnet may be relatively easy, this task can become exponentially harder when the computer assets are not just from a single user but for computer assets spread out over multiple subnets that involves multiple offices, multiple countries, or multiple continents. For many large organizations, the number of computer assets can number in the thousands, tens of thousands, or hundreds of the thousands. Certain approaches for obtaining information about computer assets in an enterprise involve running agents on each device for which information is desired. Additionally, credentials (i.e., authorization) are often required to access information about computer assets. However, the providing of credentials may be unwieldy (because of the number of different credentials needed) and/or undesirable (because of security risks). Consequently, there is a need for an improved methodology for discovering/tracking computer assets within an enterprise.

SUMMARY

A method includes identifying computer assets within a defined network using scanning services respectively connected to each of a plurality of network zones within the defined network. A plurality of internet protocol (IP) addresses within the particular one of the network zones are identified by a particular scanning service contained within the particular one of the network zones. The particular scanning service collects information associated with each of the plurality of IP addresses and infers, using the collected information, additional information about the plurality of IP addresses. The particular scanning service validates the additional information and presents analytics based upon the collected information and the additional information. Firewalls contained within the particular one of the network zones are configured to allow access by the particular scanning service.

A computer hardware system configured to identify computer assets within a defined network using scanning services respectively connected to each of a plurality of network zones within the defined network includes a hardware processor configured to perform the following operations. A plurality of internet protocol (IP) addresses within the particular one of the network zones are identified by a particular scanning service contained within the particular one of the network zones. The particular scanning service collects information associated with each of the plurality of IP addresses and infers, using the collected information, additional information about the plurality of IP addresses. The particular scanning service validates the additional information and presents analytics based upon the collected information and the additional information. Firewalls contained within the particular one of the network zones are configured to allow access by the particular scanning service.

A computer program product for identifying computer assets within a defined network using scanning services respectively connected to each of a plurality of network zones within the defined network includes a computer readable storage medium having stored therein program code. The program code, which when executed by a computer hardware system, cause the computer hardware system to perform the following operations. A plurality of internet protocol (IP) addresses within the particular one of the network zones are identified by a particular scanning service contained within the particular one of the network zones. The particular scanning service collects information associated with each of the plurality of IP addresses and infers, using the collected information, additional information about the plurality of IP addresses. The particular scanning service validates the additional information and presents analytics based upon the collected information and the additional information. Firewalls contained within the particular one of the network zones are configured to allow access by the particular scanning service.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 2:
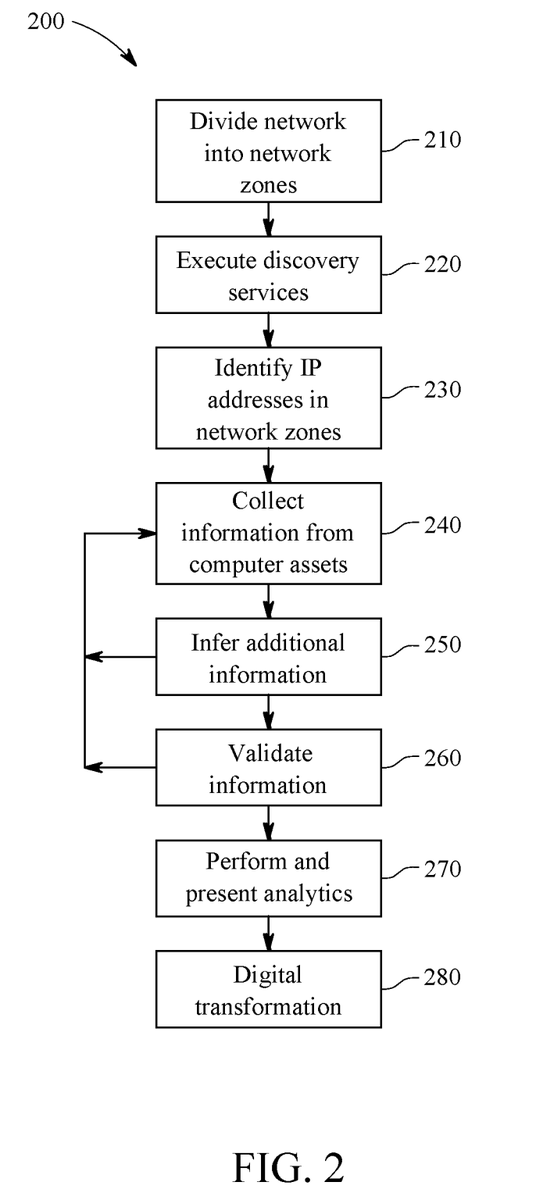
FIG. 2 is a block diagram illustrating an example method using the architecture of FIG. 3.
Figure 3:
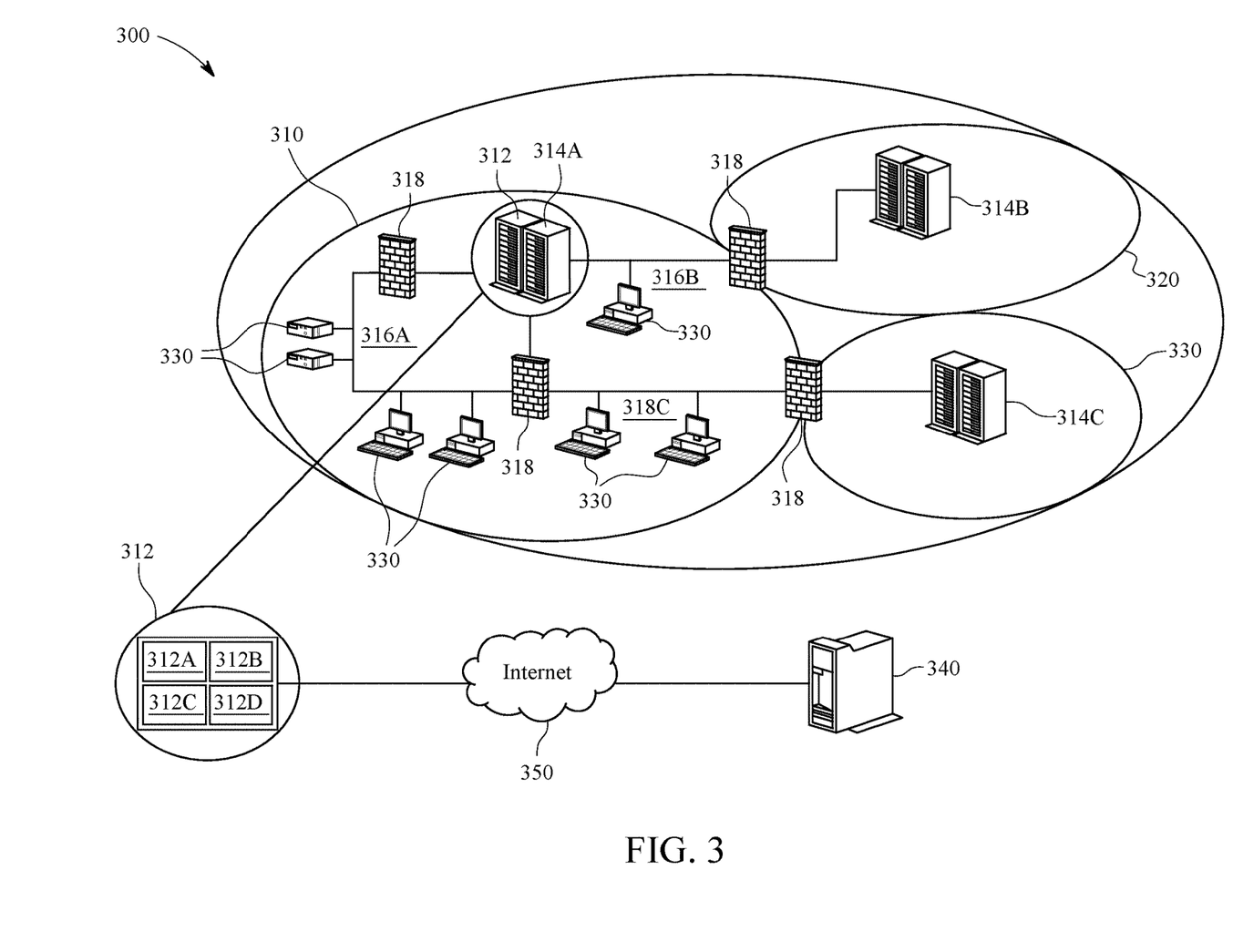
FIG. 3 is a block diagram illustrating an example architecture for performing computer asset discovery.

Reference is made to FIG. 2 and FIG. 3, which respectively illustrate a methodology 200 of performing Asset Discovery as a Service (also referred to as the ADaaS toolset) and an architecture on which the ADaaS toolset is employed according to certain aspects of the present disclosure.

In 210, a defined network, such as an enterprise network 300, is divided into multiple network zones 310, 320, 330. The manner by which the enterprise network 300 is divided is not limited. However, in certain aspects, each network zone is configured in a manner that permits a scanning service 312 executing in a hub 314A-C respectively established for each network zone 310, 320, 330 to access all IP addresses within the respective network zone. In certain circumstances, a particular network zone 310 may comprise a single subnet 316A, but in other instances, the network zone 310 may comprise multiple subnets 316A-C that are typically separated by a firewall(s) 318. Throughout the present disclosure, although the discussion is being made with regard to one particular network zone 310, the ADaaS toolset is not limited in this manner, as the discussion can also apply to one or more other network zones 320, 330 that have been established in the enterprise network 300.

As a matter of convention, not all ports within the firewall(s) 318 are opened between two networks (e.g., the multiple subnets 316A-C) in the particular network zone 310. Additionally, the ports may be opened only as needed. In certain aspects where a firewall(s) 318 is present in the particular network zone 310, the firewall(s) 318 is configured to allow scanning requests from the scanning service 312 access to all of the IP addresses within the network zone 310. The manner by which the scanning service 312 is capable of accessing all of the IP addresses within the particular network zone 310 is not limited. For example, the scanning service 312 can operate as a "whitelisted" program which is permitted to open up ports within the firewall(s) 318.

In 220, instances of the scanning service 312 are executed within a hub 314A-C for each of the multiple network zones 310, 320, 330. The scanning service 312 is not limited as to a particular hub in which the scanning service 312 is executing. For example, the scanning service 312 can execute in a computer that is newly-connected to the particular network zone 310. As another example, the scanning service 312 can execute within a preexisting computer, e.g., a server, within the particular network zone 310. In either instance, the scanning service 312 can be a standalone service or access resources located external to the network zone 310.

The ADaaS toolset can employ an agentless process, which means that software is not required to be installed on devices associated with the computer assets. Thus, although a scanning service 312 is required to be installed in a particular network zone 310 and firewalls 318, if present within the particular network zone 310, need to permit access to the IP addresses within the particular network zone 310, the ADaaS toolset does not require any other modifications (e.g., the installation of software) to other computer devices within the particular network zone 310.

An example of resources used by the scanning service 312 includes an ADaaS database 340. The ADaaS database 340 can be stored locally, for example each instance of the scanning service 312 may include a version. Alternatively, the scanning service 312 may accessing the ADaaS database 340 in a private cloud or in a virtual private cloud (VPC) or access the ADaaS database 340 stored remotely via the internet 350. Where multiple instances of the scanning service 312 are operating in each of the multiple network zones 310, 320, 330, one of the instances of the scanning service 312 may be configured to have direct VPN access to the ADaaS database 340.

The ADaaS database 340 can include, for example, information regarding standard/known software and middleware with end of life support information with each version thereof. The ADaaS database 340 can also include fingerprint information associated with particular characteristics of computer assets. This fingerprint information can provide additional information about a computer assets such as operating system, type of hardware, make of the asset, year of manufacturing, supported driver, compatible applications, OS version, and build in additional to other information. The information contained within the ADaaS database 340 can be derived, for example, from known prior experiences.

In 230, the scanning service 312 uses a scanning module 312A to search the particular network zone 310 in which the scanning service 312 is located to identify the IP addresses associated with computer assets 330 located within the particular network zone 310. Various known techniques exist for identifying IP addresses within a network, and the scanning module 312A of the present scanning service 312 is not limited as to a particular technique for identifying IP addresses. Additionally, while the scanning service 312 performs an initial scan to identify IP addresses within the particular network zone 310, the scanning service 312 can also perform subsequent scans since not all IP addresses within the particular network zone 310 may not be discoverable at certain times. By performing one or more additional scans, the scanning service 312 can identify IP addresses associated with computer assets 330 within the particular network zone 310.

Figure 4:
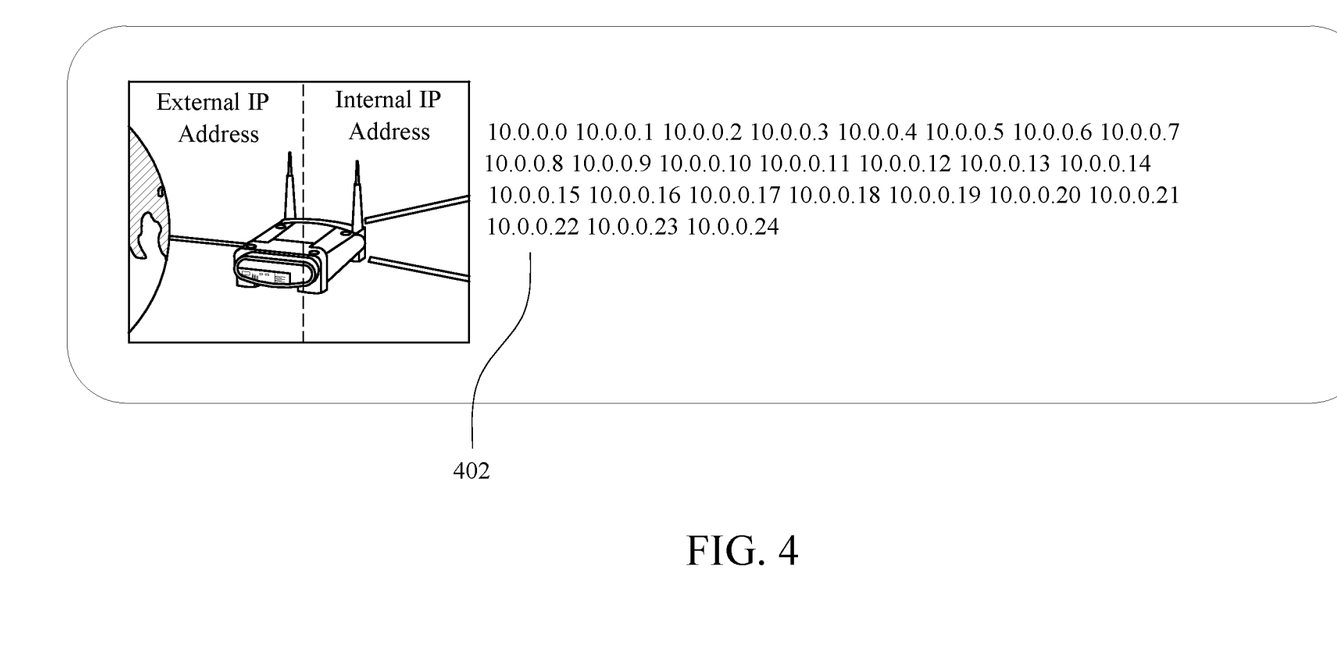
FIG. 4 illustrates exemplary data resulting from the discovery of IP addresses within a network zone according to an embodiment of the present invention.

In 240, once the list of IP addresses 402, as illustrated in FIG. 4, are generated for the particular network zone 310, the scanning service 312 uses a scanning module 312B that is configured to collect information about the computer assets 330 located within the particular network zone 310. This collection of information by the scanning module 312B employs a pull model. By comparison, a push system involves software agents being installed on computer devices associated with computer assets of interest and having these agents push data about those computer assets to some repository. However, installing software agents on computer devices is unwieldy. For example, the software agents must be configured to be run on an untold number of different devices. Additionally, many computer devices and/or software systems running on the computer devices require credentials in order to operate these software agents.

The pull model employed by the present ADaaS toolset uses the scanning module 312B to pull data from the previously-identified IP addresses 402, and collection of this information can be both active and passive. As previously discussed, the ADaaS toolset can be an agentless process such that software agents are not required to be installed on the computer devices associated with each of the previously-discovered IP addresses 402.

During the passive collection of data, credentials (e.g., digital certificates, authorization, etc.) are not necessary to collect data. For example, the scanning of the ports by the scanning service 312 can be performed without credentials. Although credentialed scanning can provide additional information about the particular computer asset associated with an IP address, it may be impractical to obtain credentials for each of the possible computer assets associated with all of the possible IP addresses. However, the ADaaS toolset contemplates that even without credentials, certain information can be obtained about the computer assets associated with the IP addresses. A benefit of scanning the ports without credentials is that ADaaS toolset can be implemented with significantly less preparatory work (e.g., the enterprise sharing endpoint credentials).

As an example, to passively collect information, the scanning service 312 can scan/poll ports for each IP address to determine whether these ports of a particular IP address are open. In certain aspects, the scanning service 312 operates by scanning known ranges and known ports. Each IP address has one or more ports exposed through which communications occur. Port numbers can run from 0 to 65335. Ports with numbers 0-1023 are called system or 'well-known ports'; ports with numbers 1024-49151 are called user or registered ports; and ports with numbers 49152-65535 are called dynamic, private or ephemeral ports. Both system and user ports are used by transport protocols (TCP, UDP, DCCP, SCTP) to identify an application or service. By determining what ports are open for a particular IP address and the network handshaking pattern associated with the port, the scanning service 312 can gather information that can be used to determine characteristics of both the hardware and software associated with the IP address being scanned. While the scanning service 312 is configured to scan known ports, the ADaaS toolset is not limited in this manner. For example, all ports can be scanned by the scanning service 312—if, for example, the scanning of known ports does not yield sufficient information about the computer assets 330.

In addition to determining whether particular ports are opened for an IP address, the scanning service 312 can also active engage selected ports for each IP address by submitting predefined requests to these ports. Depending upon the application/service associated with the port, these predefined requests are configured to elicit a particular response that can provide additional information from which to determine additional characteristics of the computer asset 330 associated with the IP address.

As a result of both the active and passive collection of data, the scanning service can collect information regarding the computer assets 330 including device ID, fingerprints of physical devices, type of protocol support for contact, host operating system, CPU, RAM, disk storage, network latency, network packets, uptime, TTL time, certificate availability, network credentials, broadcasting behaviors, protocol discovery, protocol information, frequency of switch on/off along with various other information.

In certain aspects, the scanning service 312 executes continuously for a pre-defined period while continuing to passively poll and actively engage the ports of the IP addresses 402. Although not limited to a particular amount of time, in certain aspects, the predefined period can be greater than a month (e.g., 35 days) so as to ensure the capture of data associated with monthly events.

In 250, the information or metadata obtained by the scanning service 312 can be compared with previously-stored signatures contained within the ADaaS database 340 to generate additional insights about the computer assets 330. For example, port mapping and metadata obtained from those ports can be compared with the previous-stored signatures to predict assets types of the computer assets 330 associated with a particular port. Computer assets 330—can also be identified by usage patterns. In this manner, additional characteristics of the computer assets 330 can be derived and presented as discovered (or inferred) data. The additional characteristics can include infrastructure details include, for example, operating systems, OS Version, and host names.

For example, the scanning service 312 may continually monitor port 9100 for a particular IP address. Port 9100 is associated with a particular protocol for networking printing, and consequently, this port being opened indicates that the particular device associated with the IP address may be either a network printer or a device that is requesting a print job. When this information is combined with other information obtain from the IP address and compared with the signatures contained within the ADaaS database 340, additional insights about the IP address can be inferred such as the operating system, services behind a port, network credentials, and challenge types. However, the ADaaS toolset does not require the computer assets 330 already be contained within the ADaaS database 340. In situations where an exact match is not obtained, the scanning service 312 can infer a mostly-likely match and calculate a confidence level for that most-likely match.

In 260, the information collected from the IP addresses and inferred based upon comparisons with the signatures contained within the ADaaS database 340 can be validated/revalidated with a validation module 312C of the scanning service. Top-down assets can be validated by a bottom-up approach using harvested patterns. The network traffic information is categorized to upstream and downstream, which shows the connectivity between different assets. When an enterprise installs a software system, the enterprise host a number of applications for the system.

When a task is requested by a user, the task is delegated to one of the application which in turn may delegate the request to multiple related applications. As an illustrative example, assume that a software system includes four applications (A, B, C, D). If a user invokes a request for a report from application B, application B may then request more information from application C (as a downstream application). Additionally, application C internally uses data prepared by application A, and application A pushes transaction activity details to application D and application C. For purposes of this example, every application is presumed to have its own hardware, hosting platform and databases and are inter-connected by computer networks (i.e., in affinity'). The communication between two applications happens through hosting assets→networks→program instance→port of upstream application to hosting assets→networks→program instance→port of downstream application. With modernization and migration, these applications must be grouped together for a move and a thoughtful synchronization must happen while redeploying these applications in target platform.

Figure 5:
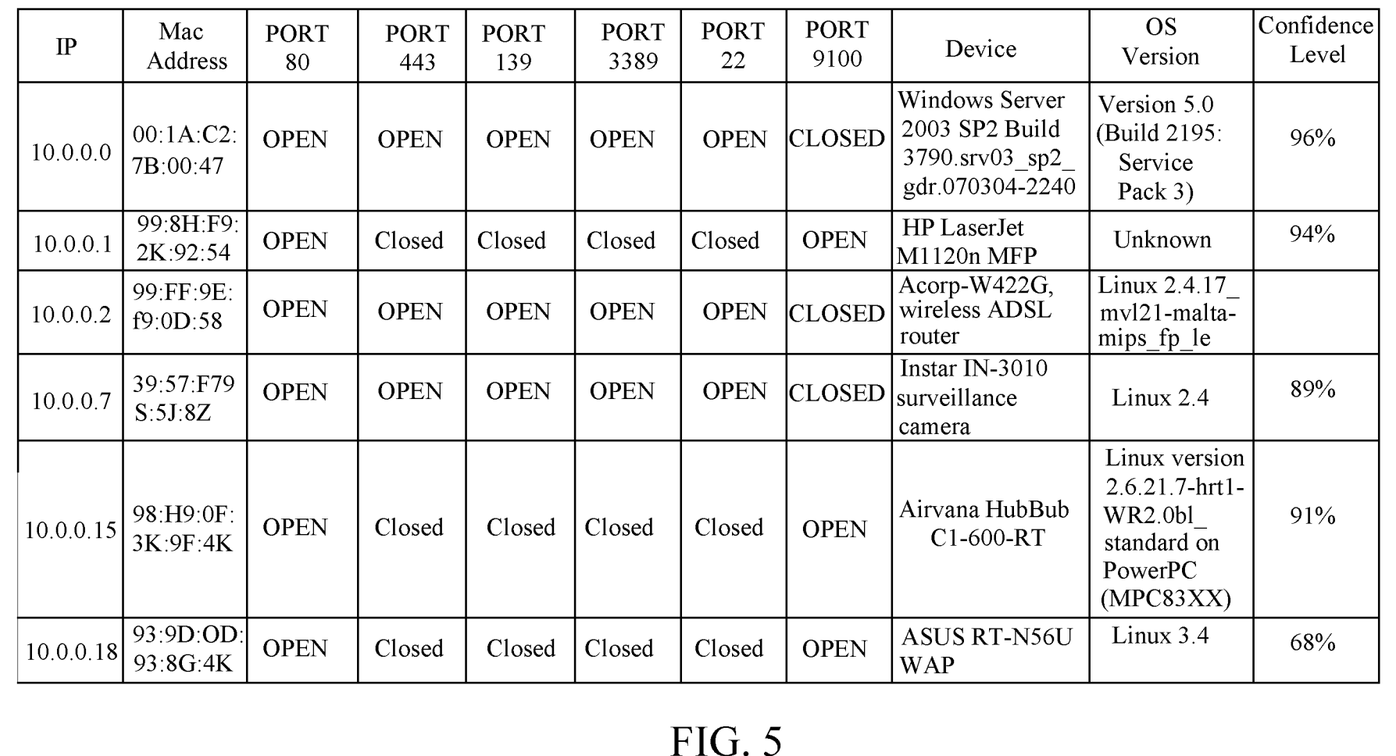
FIG. 5 illustrates exemplary data resulting from the scanning and inferring data from IP address according to an embodiment of the present invention.

Additionally, as information is collected about the enterprise network 300 that information can be used to update the signatures contained within the ADaaS database 340. Additionally, as new computer assets 330 are identified/discovered, whether they are hardware or software, the signatures of these computer assets 330 can be added to the ADaaS database 340. These new signatures can also be compared against previously-collected information to determine if that previously-collected information matches and how close the previously-collected information matches. Where an exact match does not exist, the ADaaS toolset can employ the ADaaS database to provide an estimation of the asset type (and/or other characteristics) along with a confidence level based upon how closely the collected information matches a particular signature. FIG. 5 is an example of data collected, inferred, and validated for the particular network zone 310.

Figure 6:
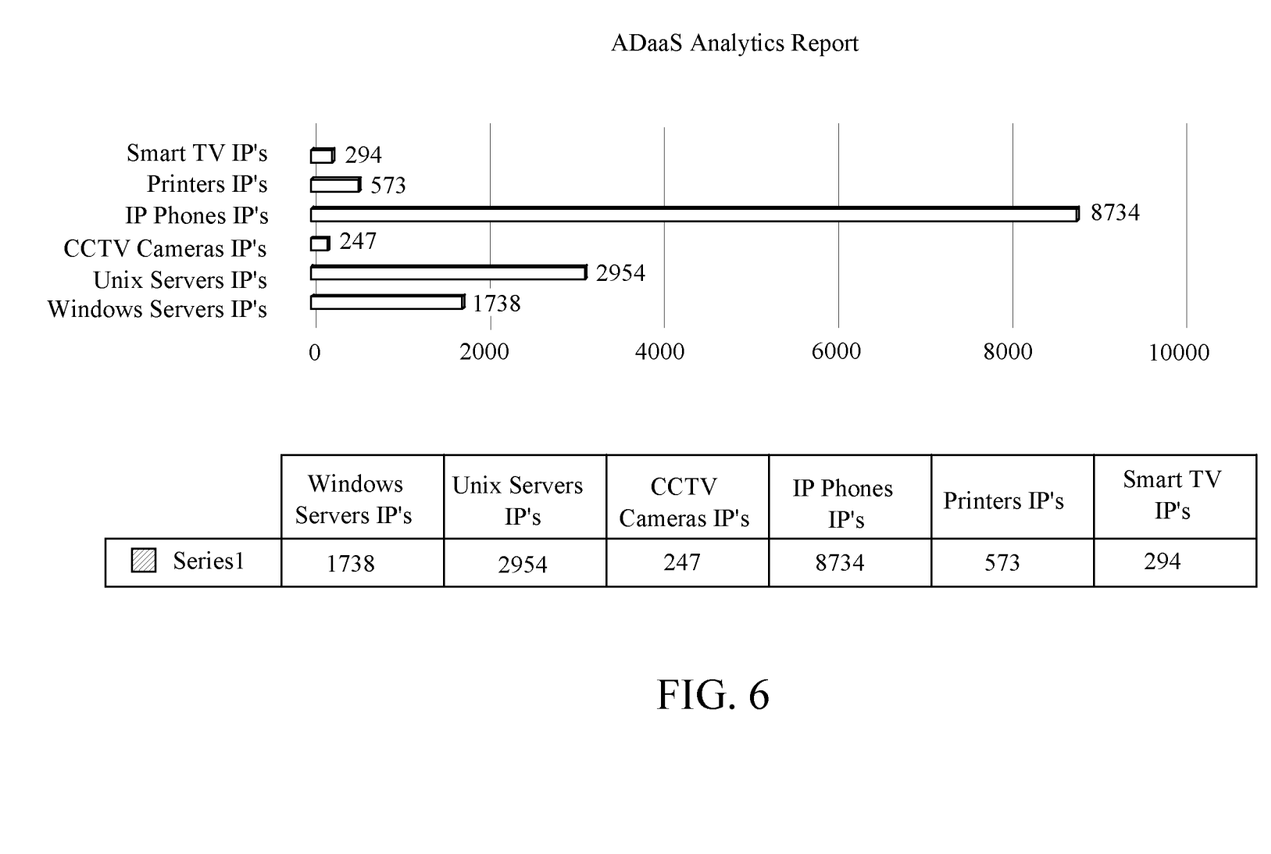
FIG. 6 illustrates exemplary analytics presented according to an embodiment of the present invention.

In 270, analytics are performed on the collected and inferred characteristics using an analytics module of the scanning service 312, the infrastructure details are derived and can be presented as discovery data. Although not limited in this particular manner, FIG. 6 is an example of the type of analytics performed and presented to a user. As illustrated therein, the analytics can identify the number of asset types (e.g., Smart TV, Printer, IP Phone, CCTV Camera, Unix Server, Windows Server) of hardware contained within the enterprise network 300. This data case also be separated out by network zone 310 and/or subnet. As another example, a similar type of analytics can also be performed on applications within the enterprise network 300.

Other types of analytics that can be performed and the results presented include the identification of connected hardware and software, operating systems, applications, and databases and middleware. This information will help customer set the baseline inventory for migration/modernization roadmap. This analysis doesn't require client to share their endpoint credentials and ADaaS toolset still will be able to provide them the desired baseline.

As another example, the ADaaS toolset can identify "end-of-life" or "out-of-support" computer assets 330, such as operating systems, middleware, databases, and servers. schedules of connecting jobs without having credentials/access to the servers. In the context of digital transformation, this provides the enterprise with information about what hardware/software need to be updated and/or replaced.

In yet another example, the enterprise running a business application may like to know the communication between the computer assets 330 and frequency of these communications. This traffic information can be leveraged to determine for a computer asset 330 and/or whether the computer asset 330 is switched off.

Although the functions of the validation module 312C and analytics module 312D are illustrated as being associated with the scanning service 312 located in the particular network zone 310, the ADaaS toolset is not limited in this manner. For example, the validation module 312C and analytics module 312D can be reside externally with the ADaaS database 340.

In 280, after characteristics of the computer assets 330 have been identified and the analytics of that data has been performed, digital transformation of the enterprise network 300 can begin or proceed. This may include, for example, replacing out-of-date (or nearly out-of-date) computer assets 330 identified by the ADaaS toolset. As another example, for a particular application of interest, the ADaaS toolset can be involved in reverse engineering an application and redraw an architecture for a target cloud. The ADaaS toolset can also be used to detect the upstream and downstream interfaces for the application in order to identify the dependent services for the application. The ADaaS toolset can provide bottom-up analysis to draw a system context diagram and help in refactoring the code.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 7:
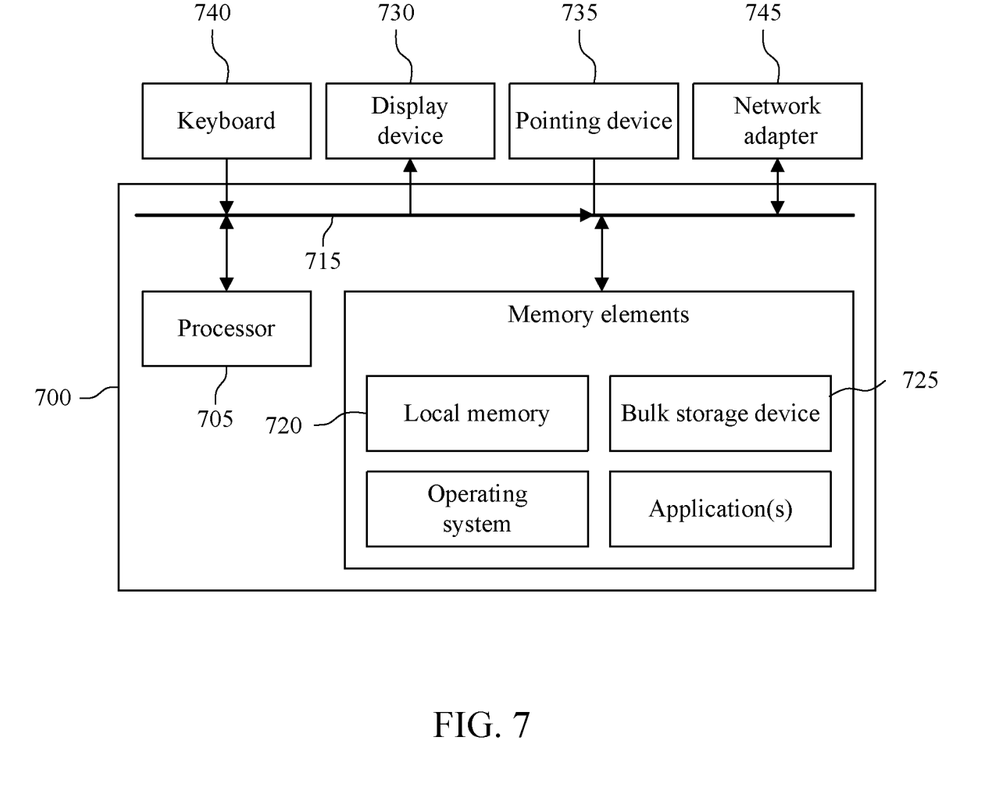
FIG. 7 is a block diagram illustrating an example of computer hardware system for implementing the scanning service of FIG. 3.

FIG. 7 is a block diagram illustrating example architecture for a data processing service 700 for executing the scanning service. The data processing system 700 can include at least one processor 705 (e.g., a central processing unit) coupled to memory elements 710 through a system bus 715 or other suitable circuitry. As such, the data processing system 700 can store program code within the memory elements 710. The processor 705 can execute the program code accessed from the memory elements 710 via the system bus 715. It should be appreciated that the data processing system 700 can be implemented in the form of any system including a processor and memory that is capable of performing the functions and/or operations described within this specification. For example, the data processing system 700 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 710 can include one or more physical memory devices such as, for example, local memory 720 and one or more bulk storage devices 725. Local memory 720 refers to random access memory (RAM)

or other non-persistent memory device(s) generally used during actual execution of the program code. The bulk storage device(s) 725 can be implemented as a hard disk drive (HDD), solid state drive (SSD), or other persistent data storage device. The data processing system 700 also can include one or more cache memories (not shown) that provide temporary storage of at least some program code in order to reduce the number of times program code must be retrieved from the local memory 720 and/or bulk storage device 725 during execution.

Input/output (I/O) devices such as a display 730, a pointing device 735 and, optionally, a keyboard 740 can be coupled to the data processing system 700. The I/O devices can be coupled to the data processing system 700 either directly or through intervening I/O controllers. For example, the display 730 can be coupled to the data processing system 700 via a graphics processing unit (GPU), which may be a component of the processor 705 or a discrete device. One or more network adapters 745 also can be coupled to data processing system 700 to enable the data processing system 700 to become coupled to other systems, computer systems, remote printers, and/or remote storage devices through intervening private or public networks. Modems, cable modems, transceivers, and Ethernet cards are examples of different types of network adapters 745 that can be used with the data processing system 700.

As pictured in FIG. 7, the memory elements 710 can store the components of the scanning service 312 of FIG. 3. Being implemented in the form of executable program code, these components of the data processing system 700 can be executed by the data processing system 300 and, as such, can be considered part of the data processing system 700.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
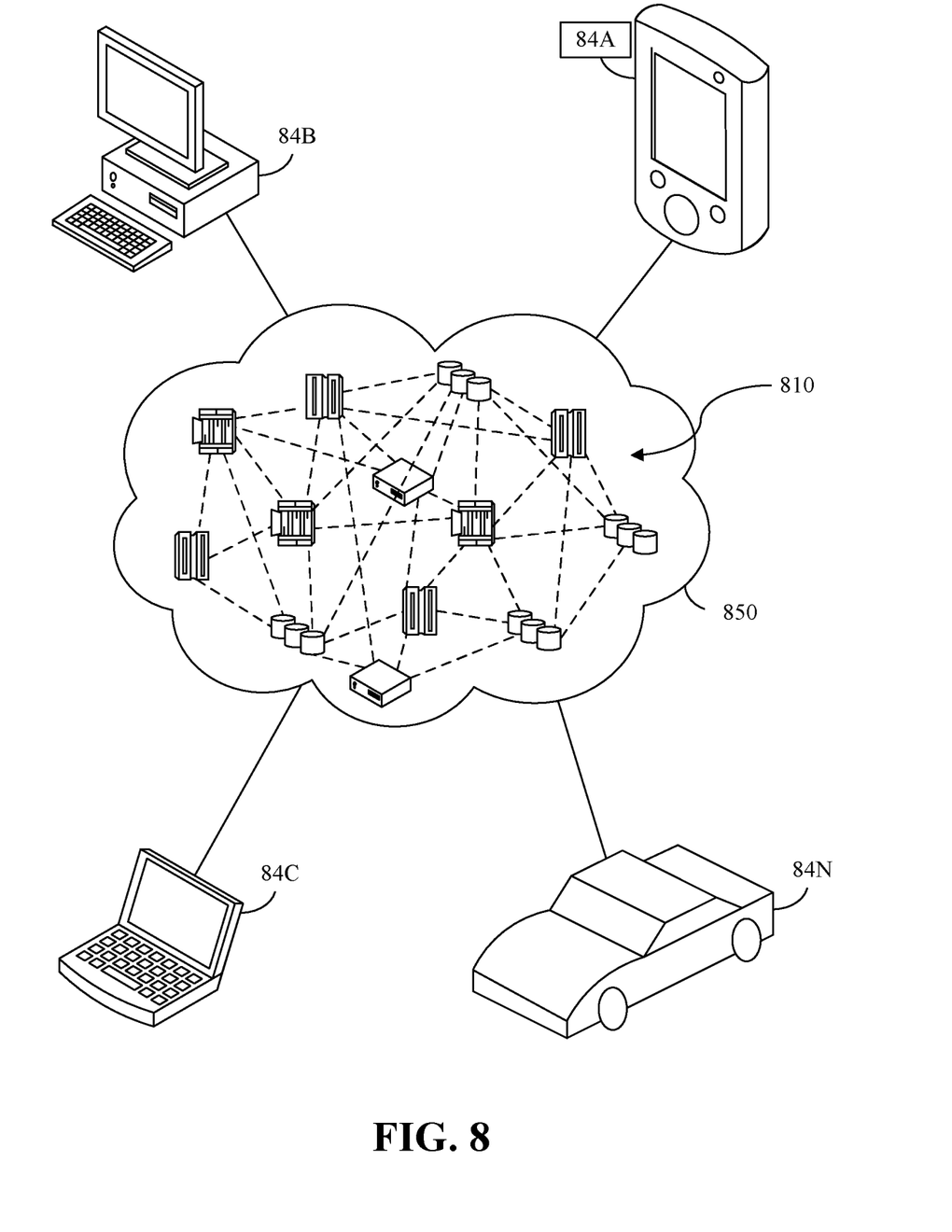
FIG. 8 depicts a cloud computing environment according to an embodiment of the present invention.

Referring now to FIG. 8, illustrative cloud computing environment 850 to be used with the ADaaS toolset is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
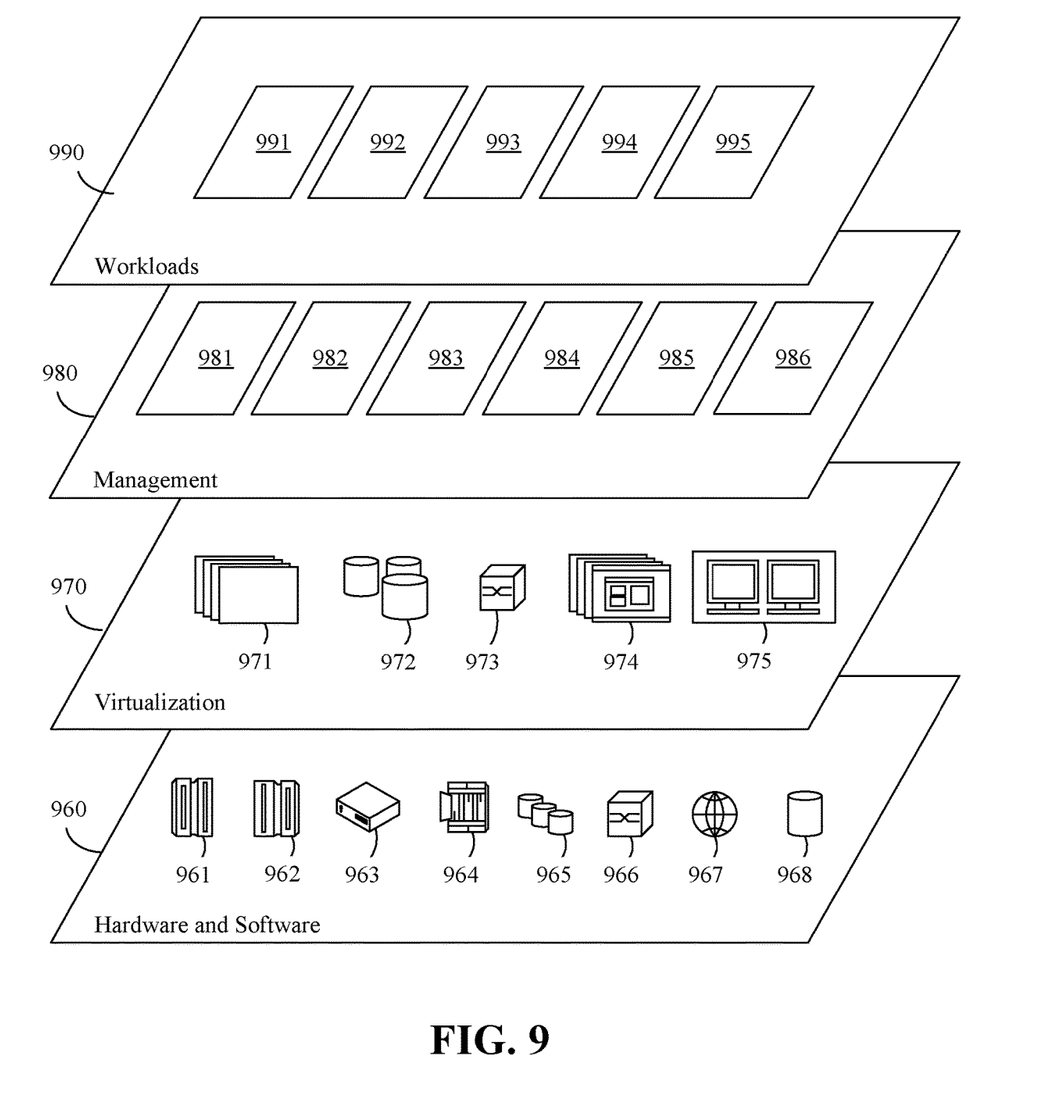
FIG. 9 depicts abstraction model layers according to an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and operations of the ADaaS toolset 996.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented process of identifying computer assets within a defined network using scanning services respectively connected to each of a plurality of network zones within the defined network, comprising:
    identifying, by a particular scanning service contained within the particular one of the network zones, a plurality of internet protocol (IP) addresses within the particular one of the network zones;
    collecting, by the particular scanning service, collected information associated with each of the plurality of IP addresses;
    inferring, by the particular scanning service and using the collected information associated with each of the plurality of IP addresses, additional information about the plurality of IP addresses;
    validating, by the particular scanning service, the additional information; and
    presenting, using a graphical user interface connected to the particular scanning service, analytics based upon the collected information and the additional information, wherein
    firewalls contained within the particular one of the network zones are configured to allow access by the particular scanning service, and
    the identifying, the collecting, and the inferring are performed for each of the plurality of network zones.

2. The method of claim 1, wherein
the collecting includes accessing well-known known ports for each of the plurality of IP addresses.

3. The method of claim 2, wherein
the accessing is performed without credentials.

4. The method of claim 1, wherein
the collecting is performed over a predetermined amount of time.

5. The method of claim 1, wherein
the inferring includes comparing the collected information to computer asset signatures contained within a database.

6. The method of claim 5, wherein
the database is located externally to the defined network.

7. The method of claim 1, wherein
the collecting includes submitting predefined requests to certain ports associated with the plurality of IP addresses.

8. The method of claim 1, wherein
the analytics include collected data and inferred data from all scanning services connected to the plurality of network zones.

9. A computer hardware system configured to identify computer assets within a defined network using scanning services respectively connected to each of a plurality of network zones within the defined network, comprising:
    a hardware processor configured to perform the following executable operations:
        identifying, by a particular scanning service contained within the particular one of the network zones, a plurality of interne protocol (IP) addresses within the particular one of the network zones;
        collecting, by the particular scanning service, collected information associated with each of the plurality of IP addresses;
        inferring, by the particular scanning service and using the collected information associated with each of the plurality of IP addresses, additional information about the plurality of IP addresses;
        validating, by the particular scanning service, the additional information; and
        presenting, using a graphical user interface connected to the particular scanning service, analytics based upon the collected information and the additional information, wherein
    firewalls contained within the particular one of the network zones are configured to allow access by the particular scanning service, and
    the identifying, the collecting, and the inferring are performed for each of the plurality of network zones.

10. The system of claim 9, wherein
the collecting includes accessing well-known known ports for each of the plurality of IP addresses.

11. The system of claim 10, wherein
the accessing is performed without credentials.

12. The system of claim 9, wherein
the collecting is performed over a predetermined amount of time.

13. The system of claim 9, wherein
the inferring includes comparing the collected information to computer asset signatures contained within a database.

14. The system of claim 13, wherein
the database is located externally to the defined network.

15. The system of claim 9, wherein
the collecting includes submitting predefined requests to certain ports associated with the plurality of IP addresses.

16. The system of claim 9, wherein
the analytics include collected data and inferred data from all scanning services connected to the plurality of network zones.

17. A computer program product for identifying computer assets within a defined network using scanning services respectively connected to each of a plurality of network zones within the defined network, comprising:
    a computer readable storage medium having stored therein program code,
    the program code, which when executed by a computer hardware system, cause the computer hardware system to perform:
        identifying, by a particular scanning service contained within the particular one of the network zones, a plurality of interne protocol (IP) addresses within the particular one of the network zones;
        collecting, by the particular scanning service, collected information associated with each of the plurality of IP addresses;
        inferring, by the particular scanning service and using the collected information associated with each of the plurality of IP addresses, additional information about the plurality of IP addresses;
        validating, by the particular scanning service, the additional information; and
        presenting, using a graphical user interface connected to the particular scanning service, analytics based upon the collected information and the additional information, wherein firewalls contained within the particular one of the network zones are configured to allow access by the particular scanning service, and the identifying, the collecting, and the inferring are performed for each of the plurality of network zones.

18. The computer program product of claim 17, wherein the collecting includes accessing well-known known ports for each of the plurality of IP addresses.

19. The computer program product of claim 18, wherein the accessing is performed without credentials.

20. The computer program product of claim 17, wherein the inferring includes comparing the collected information to computer asset signatures contained within a database.

* * * * *